United States Patent [19]

Meiner et al.

[11] 4,046,726
[45] Sept. 6, 1977

[54] FLOOR FINISH COMPOSITION AND COMPONENTS THEREOF

[75] Inventors: Roger D. Meiner, Melrose Park; James M. Haines, Bolingbrook; Henry Alsberg, Northbrook, all of Ill.

[73] Assignee: The Richardson Company, Des Plaines, Ill.

[21] Appl. No.: 642,752

[22] Filed: Dec. 22, 1975

[51] Int. Cl.$^2$ ............................................. C08L 93/00
[52] U.S. Cl. ........................... 260/27 R; 260/28.5 R; 260/28.5 A; 260/28.5 AV; 260/29.6 T; 260/29.6 TA; 260/29.6 AN
[58] Field of Search ........... 260/27 R, 28.5 R, 28.5 A, 260/28.5 AV, 29.6 T, 29.6 TA, 29.6 AN

[56] References Cited

U.S. PATENT DOCUMENTS

| | | | |
|---|---|---|---|
| 3,297,614 | 1/1967 | Pueschner et al. | 260/29.6 T |
| 3,429,843 | 2/1969 | Arnold et al. | 260/28.5 AV |
| 3,728,418 | 4/1973 | Gleason | 260/27 R |

*Primary Examiner*—Melvyn I. Marquis
*Attorney, Agent, or Firm*—Alan M. Abrams

[57] ABSTRACT

A water insoluble emulsion polymer used as a component of floor finish formulations. The polymer comprises the emulsion polymerization reaction product of from about 5 to about 40% by weight alpha methylstyrene, from about 5 to about 40% by weight styrene and about 60% of other monoethylenically unsaturated monomers such as, for example, acrylic acid, methacrylic acid and their esters, said weights being based on the combined weight of monomers charged. The emulsion polymer is combined with an alkali soluble resin and a natural or synthetic wax to provide an emulsion floor finish product which may be of the buffable or of the self-polishing kind. The final floor finish product is an aqueous emulsion containing 8 to 45% by weight solids and preferably 10 to 20% by weight solids.

12 Claims, No Drawings

FLOOR FINISH COMPOSITION AND COMPONENTS THEREOF

BACKGROUND AND DESCRIPTION OF THE INVENTION

The present invention relates to improved compositions which are primarily useful in formulating floor finishes, and more particularly, to floor finishing formulations which include a novel water insoluble emulsion polymer that imparts improved performance characteristics (e.g., improved film gloss, leveling and recoatability) thereto.

The term "floor finish" is used herein to designate products which are intended to be applied to floor surfaces of all kinds for protection, appearance, and cleanliness, which products adhere to the floor for a reasonable time and which may be removed periodically, as desired by the user. The term includes waxes and wax-containing products as well as substitutes therefor, but excludes more or less permanent protective and decorative coatings such as paints, stains, varnishes, etc. Floor finishes of the type in question are generally resistant to unintentional or accidental removal, particularly by water, while, at the same time, affording easy removal by readily available materials, such as, for example, "strippers" or other cleaning agents including alkaline soaps and detergents.

Floor finish products of the type in question usually contain a water insoluble emulsion polymer component, a natural or synthetic wax component, and an alkali soluble resin, together with surface active agents used for wetting, emulsifying and dispersing, and a quantity of water sufficient to dilute the above solid components to a final solids content of from about 8 to about 45% in the finished product.

Customarily, the emulsion polymer component is formed by emulsion polymerization, and the component thus formed is added to other previously emulsified components, including the resin and the wax, with the resulting product being sometimes further diluted to obtain the final intended solids content.

In use, the product is applied to a clean floor, and spread about with a lambs wool applicator, sponge mop, or the like, and allowed to dry. When the water evaporates, a continous polymer film remains. In some cases, the product dries directly to a high gloss and in other cases, the film must be buffed to obtain a luster. Products of the former type are commonly referred to as self-polishing floor finishes or "waxes" even though all such products do not necessarily contain natural wax.

In evaluating an emulsion floor finish product, important properties which are usually evaluated are gloss, which, by reason of presenting a bright, clean appearance, make the product attractive; water and detergent resistance, which render the product capable of being rinsed or washed without being removed; recoatability, which permits addition of additional coats of the floor finish at intervals of days, weeks or even months after application of the original coating; and leveling, which relates to the ability of the composition to form a uniformly distributed coating without requiring great care in the application.

A desired floor finish product of the type contemplated by the present invention is one which is easy to apply, which displays a high gloss, which displays excellent leveling, is highly resistant to removal by water and perhaps low power detergents, but which can be readily removed by stronger or more concentrated "stripper" materials, usually alkaline soaps or detergents. An ideal product is also able to be buffed to a high gloss after rinsing. Still further, such a product should be compatible with additional subsequent coatings of the same product rather than requiring removal of the old wax film before application of a new emulsion.

While a number of compositions are known to be useful and effective in preparing emulsion polymers of the type described herein, and ultimately producing floor finish products from such polymers, there is still room for significant improvement in the formulation of emulsion polymers for this purpose.

In view of the existing need for still further improved floor finish products and components thereof, it is an object of the present invention to provide improved chemical compositions suitable for making improved floor finish products.

Another object is to provide a floor finish product which will provide a higher and more uniform gloss than that heretofore commonly achieved with emulsion floor finish products.

A further object is to provide an emulsion type floor finish product having detergent resistance which is not substantially reduced in respect to the detergent resistance of counterpart prior art products.

Another object is to provide an emulsion polymer which, when used as a component of a floor finish, provides improved recoatability, that is, a floor finish which may be applied over a pre-existing, dried film of the same product, even where the prior film has been in use as a floor coating for significant time.

A still further object is to provide an emulsion polymer useful in making floor finishes which have improved leveling in relation to prior art products, that is, floor coating products which require less care in application and in which the film-forming constituents tend to achieve a highly uniform thickness by reason of their inherent flow characteristics.

Another object is to provide an emulsion polymer product useful in making coating compositions having good water resistance and providing improved all-around combinations of gloss, detergent resistance, recoatability, and leveling, all without requiring additional plasticizer or other additives.

Another object is to provide an aqueous polymer emulsion useful as a component of a floor finish composition, such aqueous polymer emulsion having a water-insoluble polymer component which is the emulsion polymerization reaction product of alpha methylstyrene, styrene and other conventionally used monoethylenically unsaturated monomers.

The foregoing and other objects are achieved in practice by providing a floor finish composition and, in particular, an improved emulsion polymer component thereof. This improved emulsion polymer component is combined as an aqueous emulsion polymer system with conventional wax, resin, and surfactant components to provide a floor finish having improved gloss, recoatability, and leveling, all without the sacrificing of detergent resistance or imposing a requirement of using additional or different plasticizers.

The improved emulsion polymers of the present invention are copolymers of alpha methylstyrene and other monoethylenically unsaturated monomers which can be prepared by employing conventional emulsion polymerization techniques. In particular, alpha methylstyrene is copolymerized with styrene and other monoethylenically unsaturated monomers conventionally employed in preparing emulsion polymers used in floor finish compositions. Typical examples of such other monoethylenically unsaturated monomers include acrylic acid, methacrylic acid, esters of such acids (e.g., butyl acrylate, ethyl acrylate, methyl methacrylate, etc.), acrylonitrile, methacrylonitrile and vinyltoluene (*o, m* or *p*). Other such monoethylenically unsaturated monomers which can be used in preparing the improved emulsion polymers of the present invention are identified in U.S. Pat. Nos. 3,328,325 and 3,766,112. A preferred emulsion polymer of the present invention can be prepared by copolymerizing alpha methylstyrene, styrene, methyl methacrylate, butyl acrylate and methacrylic acid.

The emulsion polymers of the present invention contain from about 5 to about 40% by weight alpha methylstyrene, from about 5 to about 40% by weight styrene, and from about 20 to about 90% by weight of the other monoethylenically unsaturated monomers referred to above, all such percentages being based on the combined weight of monomers charged. Preferably, the combined amounts of alpha methylstyrene and styrene will equal about 40 to 60% by weight. Particularly desirable emulsion polymers embodying the present invention are prepared by copolymerizing about 10 to 20 parts by weight of alpha methylstyrene with from about 20 to 30 parts by weight of styrene and a mixture of approximately 60 parts by weight of other monoethylenically unsaturated monomers. In this regard, a superior emulsion polymer embodying the present invention is obtained by conventional emulsion polymerization techniques employing about 10 parts by weight of alpha methystyrene, about 28 parts by weight styrene, about 12 parts by weight methyl methacrylate, about 35 parts by weight butyl acrylate and about 13 parts by weight methacrylic acid. While the final polymer solids concentration of the emulsion is not critical, dilution of the emulsion with water to provide a 15% by weight polymer solids concentration can be employed to provide a suitable emulsion component which is then added to the resin and wax components.

In accordance with conventional practices, the improved emulsion polymers are prepared in the presence of suitable surface active agents or surfactants. These surfactants enable the formation of a colloidal solution for the polymerization. Typical examples of surfactants which can be employed include the alkyl aryl sulfonates, organo phosphate esters, sulfated esters of fatty acids, sodium dodecyl diphenyl disulfonates, dialkyl esters of succinic acid and other soluble anionic surfactants. Also, nonionic surfactants may be employed such as, for example, the alkyl phenyl polyethoxy ethanols, organo silicones, fluorocarbon surfactants, and the like. If desired, mixtures of such anionic and nonionic surfactants may be employed such as, for example, a mixture of the anionic surfactant, sodium lauryl sulfate, and the nonionic surfactant, nonylphenyl polyethylene glycol ether.

The amounts of these surfactants used can vary from about 0.2% up to about 10% by weight based on the combined weights of monomer charged and surfactant with from about 1 to about 3% by weight of surfactant being preferred.

As pointed out above, a typical floor finish or floor polish composition contains a polymer and wax portion, and an alkali soluble resin, together with wetting, emulsifying, and dispersing agents and water. In the following examples, the makeup of the emulsion polymer portion of the floor finish compositions will be set forth in detail. It will be understood that the completed floor finish product will contain from about 8 to about 45% solids, and preferably from about 10 to 20% solids. The solids in the completed floor finish product comprise the polymer portion, the wax portion, and the resin portion together with the non-volatile or non-fugacious components of the surfactants, plasticizers, and the like.

The ratio of emulsion polymer component to the wax component, based on the total of these components being 100%, is from 10 to 95% water insoluble emulsion polymer component, and from 5 to 90% natural or synthetic wax. If the composition is intended to be self-polishing, the wax should not be over 35% by weight, preferably 5 to 25% by weight of the combined weight of the emulsion polymer plus wax. If the composition is to be buffed rather than self-polishing, 35% by weight or more of the combined weights of the emulsion polymer and wax should be wax.

The wax component may be of any of a number of natural waxes or synthetic waxes, or mixtures thereof, known to those skilled in the art, including waxes of a vegetable, animal, synthetic, and/or mineral origin such as carnauba, candelilla, montan, lanolin, cocoa butter, cottonseed, Japan wax, bayberry, mrytle, mace, palm kernel, beeswax, spermaceti, Chinese insect, mutton tallow, polyethylene, polypropylene, waxes obtained by the hydrogenation of coconut oil or soybean oils, and the mineral waxes such as paraffin, ceresin, ozokerite and the like.

In the finished composition, the alkali-soluble resin component may comprise up to 40% of the total of the emulsion polymer and wax component, while the wetting, emulsifying, and dispersing agents may comprise from 0.5 up to 20% by weight of the total of the emulsion polymer, wax, and resin components. Preferably, the alkali soluble resin component represents some 10 to 30% of the weight of the solids present in the final floor finish composition.

The alkali-soluble resins typically used include rosin acid, maleate-modified rosin acid ester, shellac, styrene-maleic anhydride copolymers, polyesters, alkali soluble alkyds, pentaerythritol esters of rosin, manilla gum, Loba gum and the like. The selection of the exact materials used may vary widely. The emulsion polymers of the present invention are compatible with a large number of such resins, and the exact selection of such resins is a familiar matter to those skilled in this art.

EXAMPLE I

A standard or control emulsion polymer was prepared by formulating a pre-emulsion of the monomers referred to below with about 10 to about 30% of the water ultimately used in the emulsion polymer portion of the floor finish formulation, together with a surface active agent. The pre-emulsion is gradually added to a reaction vessel which includes 70 to 90% of the water used in the emulsion polymer formulation, a polymerization initiator, and additional surface active agent, at a temperature of from about 75° to 95° C. until the required degree of polymerization is achieved. One formulation was as follows:

| Monomer | Percent of Emulsion Polymer Formulation by Weight |
|---|---|
| Styrene | 38 |
| Methyl methacrylate | 12 |
| Butyl Acrylate | 35 |
| Methacrylic Acid | 13 |
| Surfactant | 2 |

The emulsion polymer just described was treated with a complex zinz salt solution so that it contained 0.4-1.0% zinc based on the emulsion, then mixed with an emulsion of about 15% wax, based on the total weight of the emulsion polymer component, and with an alkali soluble resin which was present in an amount of about 10% of the total amount of emulsion polymer and wax. The final emulsion was diluted to an over-all solids content of 15%, and applied to a clean floor by a conventional applicator, and allowed to air dry without buffing.

The film formed by the dried product was a very satisfactory floor finish having a good gloss, good detergent resistance, good leveling, and good recoatability. The requirement of the finish for a plasticizer was necessary to allow the polish to form a continuous film at room temperature or below. Needless to say, the ability to form a continuous film is a requirement of a satisfactory floor finish material. The floor finish just described is a typical finish which is commercially available and is intended to provide a good combination of gloss, recoatability, leveling and detergent resistance.

EXAMPLE II

The emulsion polymer component of a floor finish material was prepared as set forth in Example I, except that, in place of the 38% styrene, 27% styrene was used in combination with 10% alpha methylstyrene. As a result, the emulsion polymer component of the floor finish included, in combination, both styrene and alpha methylstyrene.

A floor finish material was made using the above formulation, together with the wax, resin, and other components of the standard or control specimen of Example I, which, as pointed out, was blended to optimize the combination of characteristics set forth therein. However, the product made according to Example II displayed higher gloss, better recoatability, and improved leveling when compared to the Example I product. These characteristics were achieved while maintaining equal detergent resistance. The composition did not require any more plasticizer than was required for the standard or control product of Example I.

In order to facilitate the polymerization of alpha alkyl styrenes such as alpha methylstyrene with alkyl methacrylates such as those disclosed herein as being suitable for use in the emulsion polymer component, certain inorganic persulfates, well known to those skilled in this art, and mixtures thereof may be used as polymerization initiators.

In this and the foregoing examples, the polymerization itself is normally carried out by preparing a colloidal dispersion of the monomers using anionic or nonionic surfactants of known types, including those referred to in U.S. Pat. No. 3,766,112, for example. The polymerization initiators and the catalysts of the type referred to above are useful in carrying out such reactions. The resulting emulsion or latex is capable of mixture with other components of the floor finish product, and may be dispersed further or mixed with the other components referred to herein.

Plasticizers which may be used to impart low temperature film-forming capabilities to the emulsion polymer include dibutyl phthalate, tributoxyethyl phosphate, and other plasticizers referred to in U.S. Pat. No. 3,328,325.

EXAMPLE III

The emulsion polymer component of a floor finish product was prepared according to Example I, except that, in place of 38% styrene, 19% styrene was used in combination with 19% alpha methylstyrene.

The resulting floor finish product displayed better gloss than the standard or control product, better leveling and better recoatability than the Example I product. Although the product of Example III did not require extra plasticizer, and therefore formed a satisfactory continuous film, the finished product displayed somewhat reduced, although still satisfactory, detergent resistance.

EXAMPLE IV

The emulsion polymer component of a floor finish composition was prepared using the same components as those set forth in Example I, except that in place of the 38% styrene, 38% by weight of alpha methylstyrene was used. In the formulated floor finish of this example, extra plasticizer was required to form a continuous film. When the requisite amount of extra plasticizer was used, however, the gloss properties were equal to the standard or control product of Example I.

The product of this Example displayed better recoatability than the standard or control product, and approximately equal leveling. As pointed out above, this product required additional plasticizer and, in addition, displayed detergent resistance which was further reduced with respect to the detergent resistance of the product of Example III. Accordingly, the formulation of Example IV produced a floor finish product which, while not an optimum product, was improved in an important respect in comparison to the previous standard formulation of Example I and which possessed equal gloss and leveling properties and reduced detergent resistance when compared thereto.

In accordance with an important aspect of the present invention, it has been discovered that the combination of styrene and alpha methylstyrene in percentages of from 5 to about 60% creates an improvement in certain of floor finish products, with the substitution of alpha methylstyrene for styrene in the range of about 10 to 35% being particularly beneficial. It has been found that if the alpha methylstyrene content of the polymer is too low, a negligible or small amount of improvement is noted. Correspondingly, if an excess of alpha methylstyrene is used, the product is too easily removed by detergents, and the film tends to become unduly brittle and hence displays less than optimum film forming characteristics.

In floor finish products, users are often attracted to products which display attractive characteristics and which may easily be observed by direct inspection. Accordingly, a film displaying high gloss is attractive to both domestic and commercial users of emulsion floor finishes. Likewise, users in both of these classes appreciate good recoatability, which makes maintenance of an initially good appearance very simple, and eliminates the need for frequent stripping and rewaxing. Likewise, improved leveling simplifies and makes less critical the task of applying the floor finish product. According to the present invention, a floor finish material having the above desirable characteristics can be made by simple and straightforward methods. The unique polymer blend is compatible with other known floor finish ingredients, including conventional emulsifiers, dispersing agents and other additives such as plasticizers and the like, and may be employed in making a wide variety of floor finish products.

It will thus be seen that the present invention provides an improved polymer blend for use in floor finish preparations, such blend having a number of novel advantages and characteristics, including those pointed out above and others which are inherent in the invention. Illustrative embodiments only having been described by way of example, it is contemplated that certain variations from the disclosed formulations will occur to those skilled in the art, with such variations falling within the spirit of the invention. Accordingly, the present invention is to be only limited by the scope of the appended claims.

We claim:

1. A water insoluble emulsion polymer useful for preparing a wax, alkali soluble resin and surfactant containing aqueous emulsion floor finish composition comprising the emulsion polymerization reaction product of from about 5 to about 40% by weight of alpha methylstyrene, from about 5 to about 40% by weight of styrene, and from about 20 to about 90% by weight of other copolymerizable monoethylenically unsaturated monomers, based on the combined weight of monomers charged.

2. The water insoluble emulsion polymer of claim 1 wherein said other monoethylenically unsaturated monomers are selected from the class consisting of acrylonitrile, acrylic acid, methacrylic acid, and esters of such acids.

3. The water insoluble emulsion polymer of claim 1 wherein the combined amount of alpha methylstyrene and styrene present in said polymer is equal to about 40 to 60% by weight, based on the combined weight of monomers charged.

4. The water insoluble emulsion polymer of claim 1 wherein the alpha methylstyrene content is from about 10 to about 20% by weight, the styrene content is from about 20 to about 30% by weight, and the other monoethylenically unsaturated monomer content is about 60% by weight, based upon the combined weight of monomers charged.

5. The water insoluble emulsion polymer of claim 4 wherein said other monoethylenically unsaturated monomers comprise methyl methacrylate, butyl acrylate and methacrylic acid.

6. The water insoluble emulsion polymer of claim 1 wherein said polymer comprises the emulsion polymerizarion reaction product of from about 10 to about 20% by weight of alpha methylstyrene, about 20 to about 30% by weight styrene, about 12% by weight methyl methacrylate, about 35% by weight butyl acrylate and about 13% by weight methacrylic acid, based upon the combined weight of monomers charged.

7. An aqueous emulsion floor finish composition having a dispersed solids content of from 8% to 45% by weight, based on the total weight of the composition, said solids content comprising (1) from 10 to 95% of a water insoluble emulsion polymer component comprising the emulsion polymerization reaction product of from about 5 to about 40% by weight alpha methylstyrene, from about 5 to about 40% by weight styrene and from about 20 to about 90% of other copolymerizable monoethylenically unsaturated monomers, based on the combined weight of monomers charged; (2) from 5 to 90% wax component; (3) from 10 to 40% of an alkali soluble resin component; and (4) from 0.5 to 20% of surfactant, said amounts of water insoluble emulsion polymer component, wax component, and alkali soluble resin component being based on the total weight of emulsion polymer and wax, said amount of surfactant being based on the total weight of emulsion polymer, wax and resin.

8. The floor finish composition of claim 7 wherein said other monoethylenically unsaturated monomers are selected from the class consisting of acrylonitrile, acrylic acid, methacrylic acid and esters of such acids.

9. The floor finish composition of claim 7 wherein the combined amount of alpha methylstyrene and styrene present in said water insoluble emulsion polymer is equal to about 40 to 60% by weight, based on the combined weight of monomers charged.

10. The floor finish composition of claim 7 wherein said water insoluble emulsion polymer component contains from about 10 to about 20% by weight of alpha methylstyrene, from about 20 to about 30% by weight of styrene and about 60% by weight of said other monoethylenically unsaturated monomers, based on the combined weight of monomers charged.

11. The floor finish composition of claim 7 wherein said water insoluble emulsion polymer component is a copolymer of alpha methylstyrene, styrene, methyl methacrylate, butyl acrylate and methacrylic acid, said alpha methylstyrene being present in an amount of about 28%, said methyl methacrylate being present in an amount of about 12% by weight, and butyl acrylate being present in an amount of about 35% by weight, and said methacrylic acid being present in an amount of about 13% by weight, based on the combined weight of monomers charged.

12. A method of making an improved floor finish composition, said method comprising polymerizing a mixture of from about 5 to about 40% by weight of alpha methylstyrene, from about 5 to about 40% by weight of styrene, from about 10 to about 90% by weight of a polymer made from one or more monomers of the class consisting of acrylonitrile, acrylic acid, methacrylic acid, and the esters of such acids, in emulsion form, in the presence of from about 0.2 up to about 10% by weight of a surface active agent, thereby forming a water insoluble emulsion polymer composition, and adding to said composition from about 10 up to about 90% by weight, based on the weight of said polymer composition, of a wax material, and further adding from about 5 to about 40% by weight, based on the combined weight of said emulsion polymer composition and said wax material, of an alkali soluble resin material, said components being diluted with water so as to provide, in the completed floor finish composition, a solids content of from about 8 to about 45% by weight of the entire composition.

* * * * *